United States Patent
Iida et al.

(10) Patent No.: US 11,499,486 B2
(45) Date of Patent: Nov. 15, 2022

(54) OPERATION CONTROL DEVICE AND OPERATION CONTROL METHOD FOR SINGLE SHAFT GAS TURBINE AND PROGRAM THEREFOR

(71) Applicant: MITSUBISHI HEAVY INDUSTRIES, LTD., Tokyo (JP)

(72) Inventors: Koichiro Iida, Tokyo (JP); Akihiko Saito, Tokyo (JP); Hisanobu Shinoda, Tokyo (JP); Kuniaki Aoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 427 days.

(21) Appl. No.: 16/688,242

(22) Filed: Nov. 19, 2019

(65) Prior Publication Data
US 2020/0309040 A1    Oct. 1, 2020

(30) Foreign Application Priority Data
Mar. 28, 2019  (JP) .............................. JP2019-063982

(51) Int. Cl.
*F02C 9/50* (2006.01)
*F02C 9/28* (2006.01)
(Continued)

(52) U.S. Cl.
CPC ................. *F02C 9/50* (2013.01); *F02C 9/28* (2013.01); *F02C 9/52* (2013.01); *F02C 9/54* (2013.01);
(Continued)

(58) Field of Classification Search
CPC ...... F02C 9/16; F02C 9/18; F02C 9/20; F02C 9/28; F02C 9/50; F02C 9/52; F02C 9/54;
(Continued)

(56) References Cited

U.S. PATENT DOCUMENTS 5,519,305 A * 5/1996 Nomura ................. B60L 50/61
322/14
2009/0158702 A1* 6/2009 Tonno ...................... F02C 9/54
60/39.27
(Continued)

FOREIGN PATENT DOCUMENTS

JP     H06-178599 A    6/1994
JP     2001-123852     5/2001
(Continued)

OTHER PUBLICATIONS

Office Action dated Oct. 4, 2022, issued in corresponding Japanese application No. 2019-063982, with Machine Translation, 11 pages.

*Primary Examiner* — Loren C Edwards
(74) *Attorney, Agent, or Firm* — Wenderoth, Lind & Ponack, L.L.P.

(57) ABSTRACT

An operation control device for a single shaft gas turbine selects an operation mode based on a load state of a power generator, and controls the turbine based on the operation mode. In a first operation mode, a rotational speed of the turbine is maintained within a first rotational speed range, and in a second operation mode, the rotational speed is maintained within a second rotational speed range set on a lower rotational speed side than the first rotational speed range. The second rotational speed range is set on the lower rotational speed side than the first rotational speed range with a first non-selection rotational speed range set therebetween.

12 Claims, 8 Drawing Sheets

(51) Int. Cl.
  *F02C 9/54* (2006.01)
  *F02C 9/52* (2006.01)

(52) U.S. Cl.
  CPC ...... *F05D 2260/96* (2013.01); *F05D 2270/02* (2013.01); *F05D 2270/07* (2013.01); *F05D 2270/304* (2013.01); *F05D 2270/331* (2013.01); *F05D 2270/335* (2013.01)

(58) Field of Classification Search
  CPC ............ F05D 2270/02; F05D 2270/07; F05D 2270/304; F05D 2270/331; F05D 2270/335; F05D 2260/96
  See application file for complete search history.

(56) References Cited

U.S. PATENT DOCUMENTS

| | | | |
|---|---|---|---|
| 2013/0088019 A1 | 4/2013 | Huang et al. | |
| 2014/0000270 A1* | 1/2014 | Dobbeling | F02C 3/04 60/726 |
| 2018/0100442 A1* | 4/2018 | Mathai | F04D 27/0223 |

FOREIGN PATENT DOCUMENTS

| | | |
|---|---|---|
| JP | 3677536 | 8/2005 |
| JP | 2008-180432 | 8/2008 |
| JP | 2013-85457 | 5/2013 |

\* cited by examiner

OPERATION CONTROL DEVICE AND OPERATION CONTROL METHOD FOR SINGLE SHAFT GAS TURBINE AND PROGRAM THEREFOR

TECHNICAL FIELD

This disclosure relates to an operation control device and an operation control method for a single shaft gas turbine and a program therefor.

BACKGROUND

There has been known a gas turbine configured to supply compressed air from a compressor and fuel into a combustor and drive a power generator by rotating a turbine with combustion gas generated by the combustor. As such a gas turbine, there has been known a single shaft gas turbine connected to a rotational shaft common to the compressor and the power generator. In a conventional single shaft gas turbine, a rotational speed thereof is controlled constant so that an output frequency of the power generator is synchronized with a system frequency. The constant rotational speed of such a single shaft gas turbine is set to a value to be capable of ensuring a flow rate of the compressor to some extent so that exhaust gas characteristics of the turbine (e.g., NOx concentration included in exhaust gas) satisfies standards while ensuring stable operation of the compressor regardless of load magnitude. Accordingly, at a partial load smaller than a rated load or no load, thermal efficiency tends to decrease and fuel consumption tends to increase.

In Patent Document 1, it is disclosed to control a rotational speed of a single shaft gas turbine variably in accordance with load magnitude by utilizing a variable speed power generator or an inverter control power generator as a power generator. In this document, it is suggested to improve thermal efficiency by reducing a rotational speed and to reduce fuel consumption at a partial load having a lowered load or no load.

CITATION LIST

Patent Literature

Patent Document 1: JP3677536B

SUMMARY

In the conventional single shaft gas turbine with the rotational speed thereof maintained constant as described above, normally, a vibration frequency occurring at the turbine under rated operation conditions is designed not to be matched with a natural frequency that a turbine blade essentially has. However, when the rotational speed is variably controlled in accordance with load as disclosed in Patent Document 1, there is a possibility that a resonance phenomenon occurs due to matching of the varying vibration frequency occurring at the turbine with the natural frequency, resulting in malfunction occurrence.

Further, when an electric circuit is adopted for converting a power generation frequency into a system frequency as an inverter control power generator, there is a possibility of occurrence of a shaft vibration phenomenon due to characteristics of the electric circuit (e.g., a torsion vibration phenomenon of a shaft occurring at a power generator being a Sub-Synchronous Torsional Interaction (SSTI) occurring due to interaction with a power system having a large-capacity converter).

In this regard, an object of at least one embodiment of the present invention is to provide an operation control device and an operation control method for a single shaft gas turbine capable of effectively preventing malfunction occurrence such as a shaft vibration phenomenon while improving fuel consumption by reducing a rotational speed in accordance with load and a program therefor.

(1) To solve the abovementioned problems, at least one embodiment of the present invention provides an operation control device for a single shaft gas turbine configured to supply compressed air from a compressor and fuel into a combustor and drive a power generator by rotating a turbine, connected to a rotational shaft common to the compressor and the power generator, with combustion gas generated by the combustor. Here, the operational control device includes a load state determination unit determining a load state of the power generator; an operation mode selection unit configured to be capable of selecting, based on a determination result of the load state determination unit, from among a first operation mode to maintain a rotational speed of the turbine within a first rotational speed range and a second operation mode to maintain the rotational speed within a second rotational speed range set on a lower rotational speed side than the first rotational speed range with a first non-selection rotational speed range set therebetween; and a control unit controlling the turbine based on the operation mode selected at the operation mode selection unit.

According to the configuration described above as (1), the operation mode is selected based on the load state of the power generator and rotational speed control is performed in accordance with the selected operation mode. In each operation mode, approximately-constant rotational speed control is performed as maintaining the rotational speed of the turbine within the corresponding rotational speed range. In particular, in the second operation mode, the rotational speed range is set on a lower speed side than that in the first operation mode. Therefore, fuel consumption can be reduced in accordance with the load state of the power generator.

Further, the first non-selection rotational speed range is set between the first rotational speed range corresponding to the first operation mode and the second rotational speed range corresponding to the second operation mode. Accordingly, owing to that the first non-selection rotational speed range is set to include an undesirable rotational speed, for example, corresponding to a natural frequency of a turbine blade or shaft vibration caused by an electric circuit, malfunction occurrence can be effectively prevented by avoiding operation at the undesirable rotational speed while switching the operation modes in accordance with the load states.

(2) In some embodiments, in the configuration described above as (1), the load state determination unit determines the load state based on a target load rate set for the power generator and an effective load rate of the power generator.

According to the configuration described above as (2), the load state being a selection reference of the operation mode is determined based on the target load rate being a load index for demanding of electric power and the effective load rate being a load index for supplying thereof. By utilizing the load state determined as described above, the load of the power generator can be appropriately evaluated.

(3) In some embodiments, in the configuration described above as (2), the load state determination unit determines that the load state belongs to the first load state when any one of (i) to (iii) is satisfied within a predetermined time period, and the operation mode selection unit selects the first operation mode when the load state is determined as belonging to the first load state;

(i) the target load rate is larger than a first threshold value, (ii) the effective load rate is larger than a second threshold value, and (iii) the difference between the target load rate and the effective load rate is larger than a third threshold value, and the target load rate is equal to or larger than the effective load rate.

According to the configuration described above as (3), when the load state of the power generator is determined as belonging to the first load state based on the reference described above, control is performed in accordance with the first operation mode.

(4) In some embodiments, in the configuration described above as (2) or (3), the load state determination unit determines that the load state belongs to a second load state when (iv) to (vi) are satisfied over a predetermined time period, and the operation mode selection unit selects the second operation mode when the load state is determined as belonging to the second load state;

(iv) the target load rate is equal to or smaller than a first threshold value, (v) the effective load rate is equal to or smaller than a second threshold value, and (vi) the difference between the target load rate and the effective load rate is equal to or smaller than a third threshold value, or the target load rate is smaller than the effective load rate.

According to the configuration described above as (4), when the load state of the power generator is determined as belonging to the second load state based on the reference described above, control is performed in accordance with the second operation mode. Since the rotational speed range in the second operation mode is set on a lower speed side than that in the first operation mode, fuel consumption can be effectively reduced under approximately-constant rotational speed control in which the rotational speed of the turbine is maintained within the second rotational speed range.

(5) In some embodiments, in the configuration described above as any one of (1) to (4), in the first operation mode and the second operation mode, the control unit controls output of the turbine by adjusting an opening of an inlet guide vane arranged at an upstream stage of the compressor and a flow rate of the fuel, and controls a rotational speed of the turbine by controlling output of a power converter converting an output frequency of the power generator into a system frequency.

According to the configuration described above as (5), in the first operation mode and the second operation mode, turbine output control is performed with the opening of the inlet guide vane and the flow rate of the fuel being as control parameters, and turbine rotational speed control is performed with the output of the power converter being as a control parameter. Accordingly, cooperative control to maintain the rotational speed approximately constant can be appropriately performed while satisfying power generation requirement for the power generator.

(6) In some embodiments, in the configuration described above as any one of (1) to (5), the first non-selection rotational speed range includes a natural frequency of a turbine blade included in the turbine.

According to the configuration described above as (6), owing to that the first non-selection rotational speed range is set to include the natural frequency of the turbine blade, malfunction occurrence such as breakage of the turbine blade can be effectively prevented by avoiding operation at the natural frequency of the turbine blade while switching the operation modes in accordance with load states.

(7) In some embodiments, in the configuration described above as any one of (1) to (6), the operation mode selection unit is configured to be capable of selecting a third operation mode to maintain the rotational speed within a third rotational speed range set on a lower rotational speed side than the second rotational speed range with a second non-selection rotational speed range set therebetween.

According to the configuration described above as (7), the third operation mode is selectable in addition to the first operation mode and the second operation mode described above. In the third operation mode, approximately-constant rotational speed control is performed as maintaining the rotational speed of the turbine within the third rotational speed range. Since the third rotational speed range is set on a lower speed side than the second rotational speed range, fuel consumption can be further reduced in accordance with the load state of the power generator.

Further, the second non-selection rotational speed range is set between the second rotational speed range corresponding to the second operation mode and the third rotational speed range corresponding to the third operation mode. Accordingly, owing to that the second non-selection rotational speed range is set to include an undesirable rotational speed, for example, corresponding to a natural frequency of a turbine blade or shaft vibration caused by an electric circuit, malfunction occurrence can be effectively prevented by avoiding operation at the undesirable rotational speed while switching the operation modes in accordance with the load states.

(8) In some embodiments, in the configuration described above as (7), the load state determination unit determines that the load state belongs to a third load state when (vii) and (viii) are satisfied over a predetermined time period, and the operation mode selection unit selects the third operation mode when the load state is determined as belonging to the third load state;

(vii) the target load rate is equal to or smaller than a fourth threshold value, and (viii) the effective load rate is equal to or smaller than a fifth threshold value.

According to the configuration described above as (8), when the load state of the power generator is determined as belonging to the third load state based on the reference described above, control is performed in accordance with the third operation mode. Since the rotational speed range in the third operation mode is set on a lower speed side than that in the second operation mode, fuel consumption can be reduced further effectively under approximately-constant rotational speed control in which the rotational speed of the turbine is maintained within the third rotational speed range.

(9) In some embodiments, in the configuration described above as (7) or (8), in the third operation mode, the control unit controls output of the turbine by adjusting an opening of an inlet guide vane arranged at an upstream stage of the compressor, a flow rate of the fuel, and an opening of a bleed air valve of the compressor, and controls a rotational speed of the turbine by controlling output of a power converter converting an output frequency of the power generator into a system frequency.

According to the configuration described above as (9), in the third operation mode, turbine output control is performed with the opening of the inlet guide vane, the flow rate of the fuel, and the opening of the bleed air valve being as control parameters, and turbine rotational speed control is performed with the output of the power converter being as a control parameter. Accordingly, cooperative control to maintain the rotational speed approximately constant can be appropriately performed while satisfying power generation requirement for the power generator.

(10) In some embodiments, in the configuration described above as any one of (7) to (9), the second non-selection rotational speed range includes a natural frequency of a turbine blade included in the turbine.

According to the configuration described above as (10), owing to that the second non-selection speed range is set to include the natural frequency of the turbine blade, malfunction occurrence such as breakage of the turbine blade can be effectively prevented by avoiding operation at the natural frequency of the turbine blade while switching the operation modes in accordance with load states.

(11) To solve the abovementioned problems, at least one embodiment of the present invention provides an operation control method for a single shaft gas turbine configured to supply compressed air from a compressor and fuel into a combustor and drive a power generator by rotating a turbine, connected to a rotational shaft common to the compressor and the power generator, with combustion gas generated by the combustor. Here, the operation control method includes steps of determining a load state of the power generator; selecting, based on a determination result of the load state, from among a first operation mode to maintain a rotational speed of the turbine within a first rotational speed range and a second operation mode to maintain the rotational speed within a second rotational speed range set on a lower rotational speed side than the first rotational speed range with a first non-selection rotational speed range set therebetween; and controlling the turbine based on the selected operation mode.

According to the configuration described above as (11), the operation mode is selected based on the load state of the power generator and rotational speed control is performed in accordance with the selected operation mode. In each operation mode, approximately-constant rotational speed control is performed as maintaining the rotational speed of the turbine within the corresponding rotational speed range. In particular, in the second operation mode, the rotational speed range is set on a lower speed side than that in the first operation mode. Therefore, fuel consumption can be reduced in accordance with the load state of the power generator.

Further, the first non-selection rotational speed range is set between the first rotational speed range corresponding to the first operation mode and the second rotational speed range corresponding to the second operation mode. Accordingly, owing to that the first non-selection speed range is set to include an undesirable rotational speed, for example, corresponding to a natural frequency of a turbine blade or shaft vibration caused by an electric circuit, malfunction occurrence can be effectively prevented by avoiding operation at the undesirable rotational speed while switching the operation modes in accordance with the load states.

(12) To solve the abovementioned problems, at least one embodiment of the present invention provides a program for operationally controlling a single shaft gas turbine configured to supply compressed air from a compressor and fuel into a combustor and drive a power generator by rotating a turbine, connected to a rotational shaft common to the compressor and the power generator, with combustion gas generated by the combustor. Here, the program causes a computer to execute steps of determining a load state of the power generator; selecting, based on a determination result of the load state, from among a first operation mode to maintain a rotational speed of the turbine within a first rotational speed range and a second operation mode to maintain the rotational speed within a second rotational speed range set on a lower rotational speed side than the first rotational speed range with a first non-selection rotational speed range set therebetween; and controlling the turbine based on the selected operation mode.

According to the program described above as (12), the operation mode is selected based on the load state of the power generator and rotational speed control is performed in accordance with the selected operation mode. In each operation mode, approximately-constant rotational speed control is performed as maintaining the rotational speed of the turbine within the corresponding rotational speed range. In particular, in the second operation mode, the rotational speed range is set on a lower speed side than that in the first operation mode. Therefore, fuel consumption can be reduced in accordance with the load state of the power generator.

Further, the first non-selection rotational speed range is set between the first rotational speed range corresponding to the first operation mode and the second rotational speed range corresponding to the second operation mode. Accordingly, owing to that the first non-selection speed range is set to include an undesirable rotational speed, for example, corresponding to a natural frequency of a turbine blade or shaft vibration caused by an electric circuit, malfunction occurrence can be effectively prevented by avoiding operation at the undesirable rotational speed while switching the operation modes in accordance with the load states.

According to at least one embodiment of the present invention, it is possible to provide an operation control device and an operation control method for a single shaft gas turbine capable of effectively preventing malfunction occurrence such as a shaft vibration phenomenon while improving fuel consumption by reducing a rotational speed in accordance with load and a program therefor.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
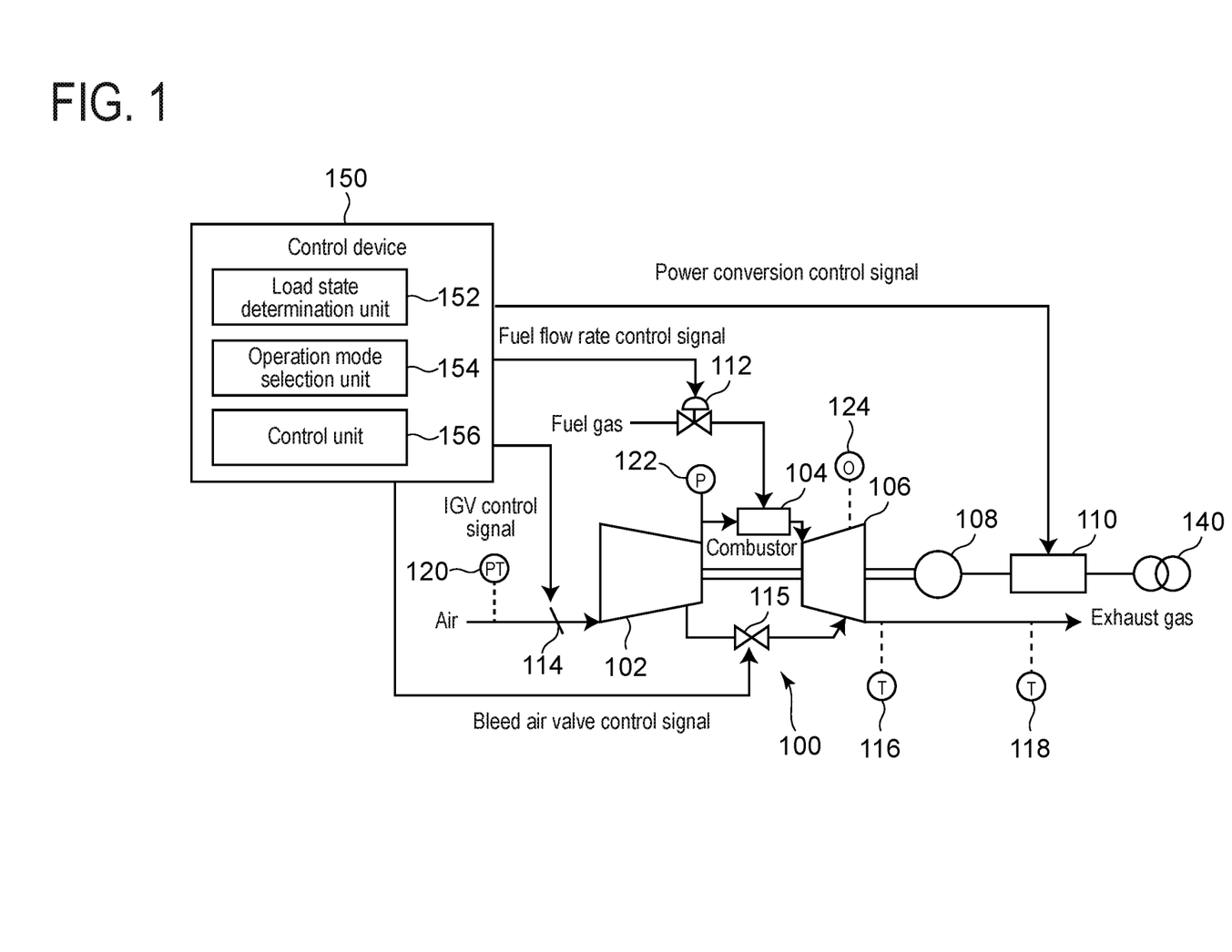
FIG. 1 is a schematic view illustrating an entire configuration of a gas turbine according to at least one embodiment of the present invention.

FIG. 1 is a schematic view illustrating an entire configuration of a gas turbine 100 according to at least one embodiment of the present invention. The gas turbine 100 includes a compressor 102, a combustor 104, a turbine 106, a power generator 108, and a power converter 110. Sucked air is compressed by the compressor 102, mixed with fuel supplied from a fuel flow rate adjusting valve 112, and combusted in the combustor 104. A fuel flow rate supplied to the combustor 104 is controllable by the fuel flow rate adjusting valve 112 operating based on a control signal (fuel control signal) from a control device 150.

High-temperature combustion gas generated at the combustor 104 generates power by being expanded in the turbine 106. Part of the power of the turbine 106 drives the compressor 102 and the rest of the power drives the power generator 108 being a load. Here, a rotational shaft of the compressor 102, a rotational shaft of the turbine 106, and a rotational shaft of the power generator 108 are integrally connected, and thus, the gas turbine 100 is a single shaft gas turbine.

Alternating-current power output from the power generator 108 is supplied to a power system 140 through the power converter 110. As described later, since a rotational speed of the gas turbine 100 (the compressor 102, the turbine 106, and the power generator 108) is variable, a power frequency output from the power generator 108 is generally different from a system frequency of the power system 140 (e.g., a commercial frequency such as 50 Hz and 60 Hz). The power frequency is converted into the system frequency by the power converter 110. Such conversion into the system power by the power converter 110 is performed based on a control signal (power conversion control signal) from the control device 150.

Here, an electric circuit included in the power converter 110 includes, for example, a converter circuit or an inverter circuit. For example, in a case that the power frequency of the power generator 108 is converted into the system frequency as described above, the power converter 110 includes a converter circuit converting alternating-current power output from the power generator 108 into direct-current power, and an inverter circuit converting the direct-current power output from the converter circuit into alternating-current power having the system frequency. In a case that output power of the power generator 108 is transmitted as direct-current power (i.e., in a case that the power system 140 is a direct-current transmission line), the power converter 110 includes a converter circuit converting alternating-current power output from the power generator 108 into direct-current power.

Further, an inlet guide vane (IGV) 114 is arranged at an upstream stage of blades at a first stage of the compressor 102. Sucked air is accelerated in the circumferential direction by the inlet guide vane 114 and introduced into the compressor 102. In the compressor 102, the introduced air is energized by being caused to pass between rotor blades and stator blades formed in a multi-stage manner and pressure thereof is increased. Further, the inlet guide vane 114 includes a plurality of movable vanes (not illustrated) arranged in a circumferential direction as being movably supported respectively. The movable vanes of the inlet guide vane 114 are driven by an actuator (not illustrated) operating with a control signal (IGV control signal) from the control device 150.

To prevent occurrence of surging in the compressor 102 during start-up or speed-up of the gas turbine 100, there is provided a bleed air valve 115 extracting part of air at pressure rising in the compressor 102 at an arbitrary rotational speed and bypasses the air to the turbine 106. Owing to that the bleed air valve 115 operates based on a control signal (bleed air valve control signal) from the control device 150, a bleed air flow rate from the compressor 102 can be controlled.

A blade pass temperature sensor 116 detecting temperature of combustion gas having passed through final stage blades is arranged at a final stage section of the turbine 106. An exhaust gas temperature sensor 118 detecting temperature of exhaust gas is arranged at an exhaust gas passage at the downstream side of the blade pass temperature sensor 116. There is arranged a sucked air state detector 120 detecting temperature and pressure of sucked air. There is arranged an in-chamber pressure sensor 122 detecting pressure in a chamber of the combustor 104. Further, there is arranged an output sensor 124 detecting output of the turbine 106.

Detection results of the blade pass temperature sensor 116, the exhaust gas temperature sensor 118, the sucked air state detector 120, the in-chamber pressure sensor 122, and the output sensor 124 are input to the control device 150. The control device 150 performs control by outputting control signals based on the input signals to corresponding elements of the gas turbine 100. Specifically, the control device 150 controls the fuel flow rate adjusting valve 112 by transmitting a fuel control signal thereto, controls the power converter 110 by transmitting a power conversion control signal thereto, controls opening of the inlet guide vane 114 by transmitting an IGV control signal thereto, and controls opening of the bleed air valve 115 by transmitting a bleed air valve control signal thereto.

Figure 2A:
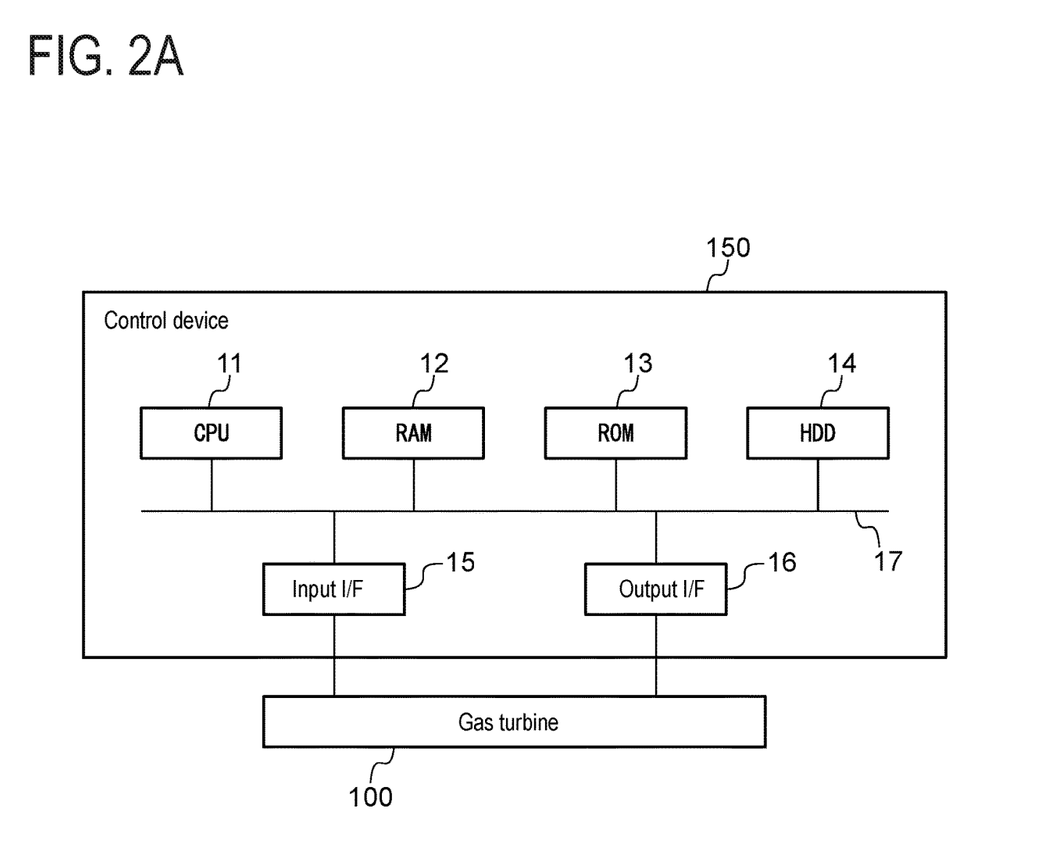
FIG. 2A is a schematic structural view illustrating an example of a hardware configuration of a control device in FIG. 1.
Figure 2B:
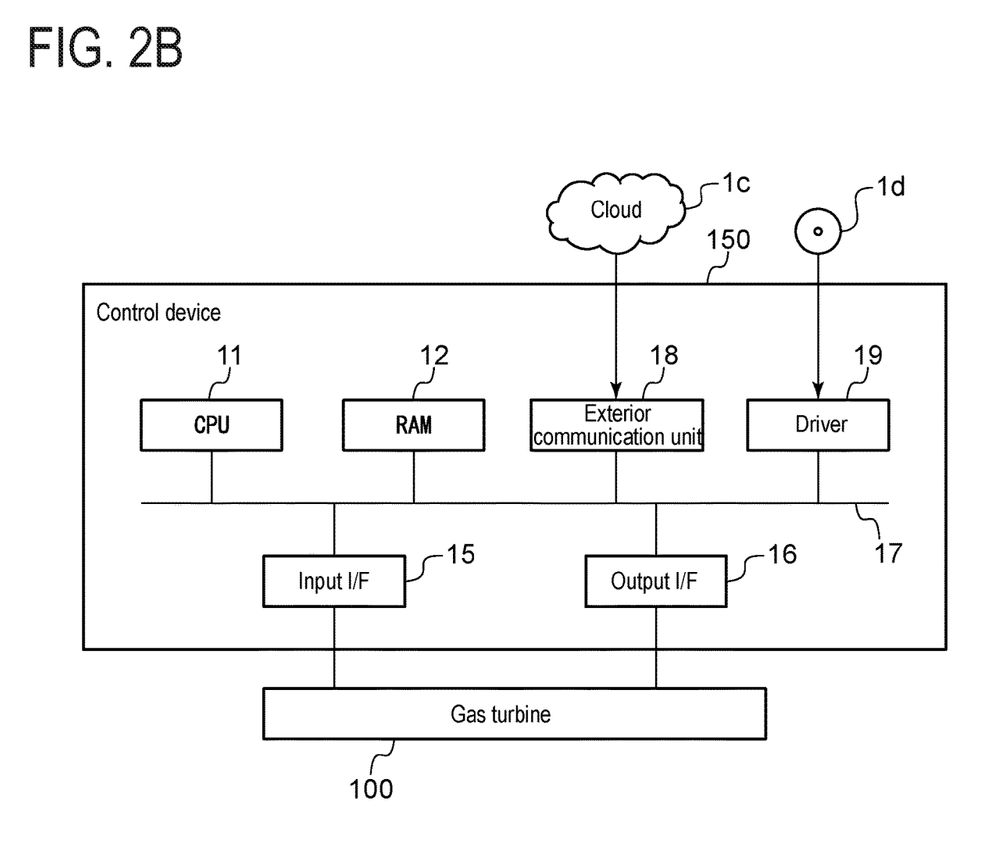
FIG. 2B is a schematic structural view illustrating another example of the hardware configuration of the control device in FIG. 1.

The control device 150 may be configured of a computer. Here, FIGS. 2A and 2B are schematic structural views each illustrating a hardware configuration of the control device 150 in FIG. 1. For example, as illustrated in FIG. 2A, the control device 150 includes a central processing unit (CPU) 11, a random access memory (RAM) 12, a read only memory (ROM) 13, a hard disk drive (HDD) 14, an input interface (I/F) 15, and an output interface (I/F) 16, which are connected with one another through a bus 17.

Not limited to the above, the hardware of the control device 150 may be configured of a combination of control circuits and memory devices.

Further, as illustrated in FIG. 2B, a program (operation condition determination program) for actualizing functions of the control device 150 may be stored in a cloud $1c$ or a memory medium $1d$. Then, the control device 150 may include an exterior communication unit 18, for example, for a wireless LAN communication such as a 4G or 5G line communication and Wi-Fi (registered trademark). The CPU 11 may read the program from the cloud $1c$ through the exterior communication unit 18, load the program to the RAM 12, and execute the program. Further, the control device 150 may include a driver 19 for reading data in the memory medium $1d$. The CPU 11 may read the program from the memory medium $1d$, load the program to the RAM 12, and execute the program. The memory medium $1d$ may be any kind, and may adopt, for example, an SD card, a USB memory, or an external HDD in accordance with capacity of the program.

The control device 150 having the hardware configuration described above has a configuration corresponding to a functional block illustrated in FIG. 1. That is, the control device 150 includes a load state determination unit 152, an operation mode selection unit 154, and a control unit 156.

The load state determination unit 152 determines a load state of the power generator 108. The determination of the load state is performed, for example, based on a target load rate Lt set for the power generator 108 and an effective load rate Le of the power generator 108. The target load rate Lt is calculated based on output demand information (i.e., a demand amount for future output of the power generator) obtained from the outside, and the effective load rate Le is calculated by obtaining a detection value of the output sensor 124.

Figure 3:
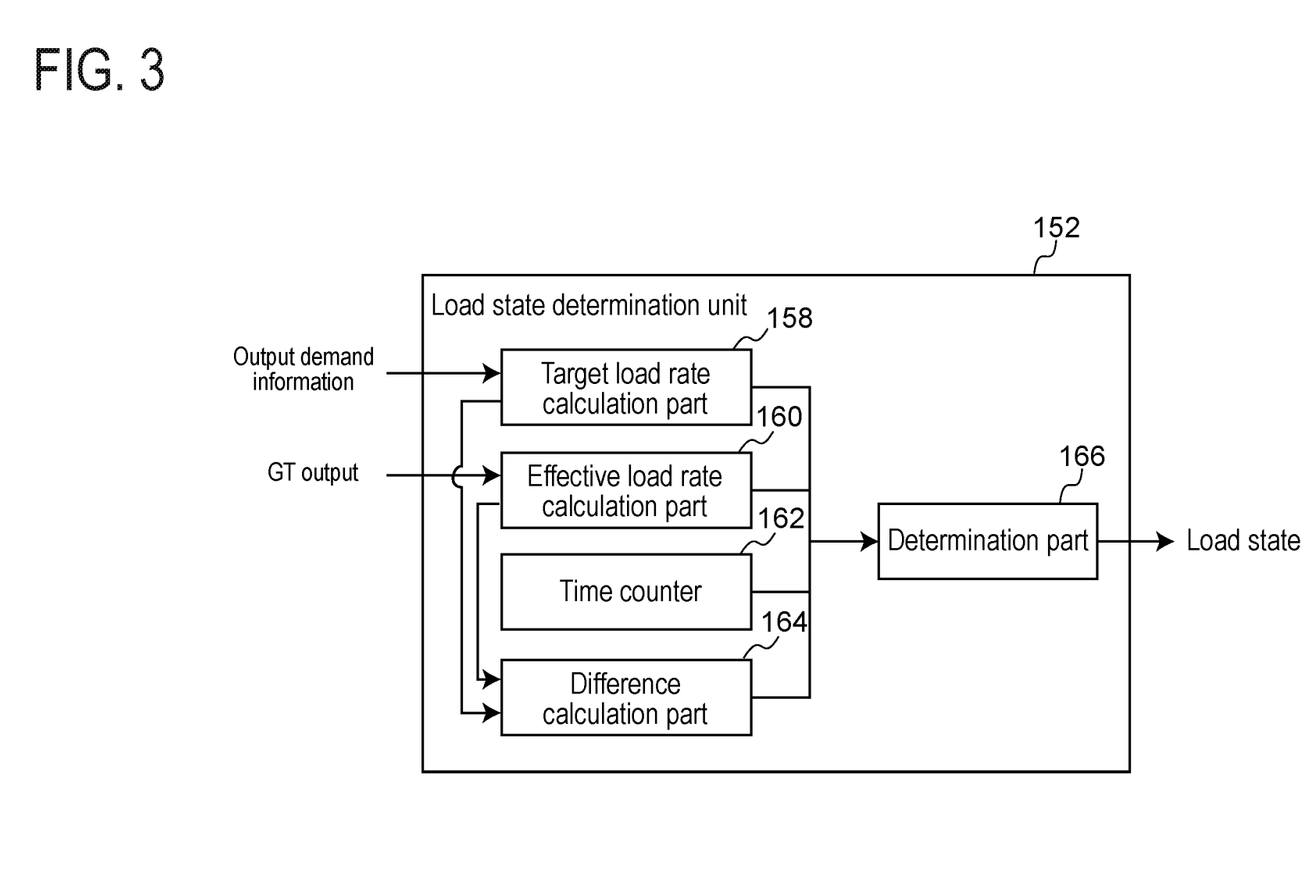
FIG. 3 is a block diagram illustrating an internal configuration of a load state determination unit in FIG. 1.
Figure 4:
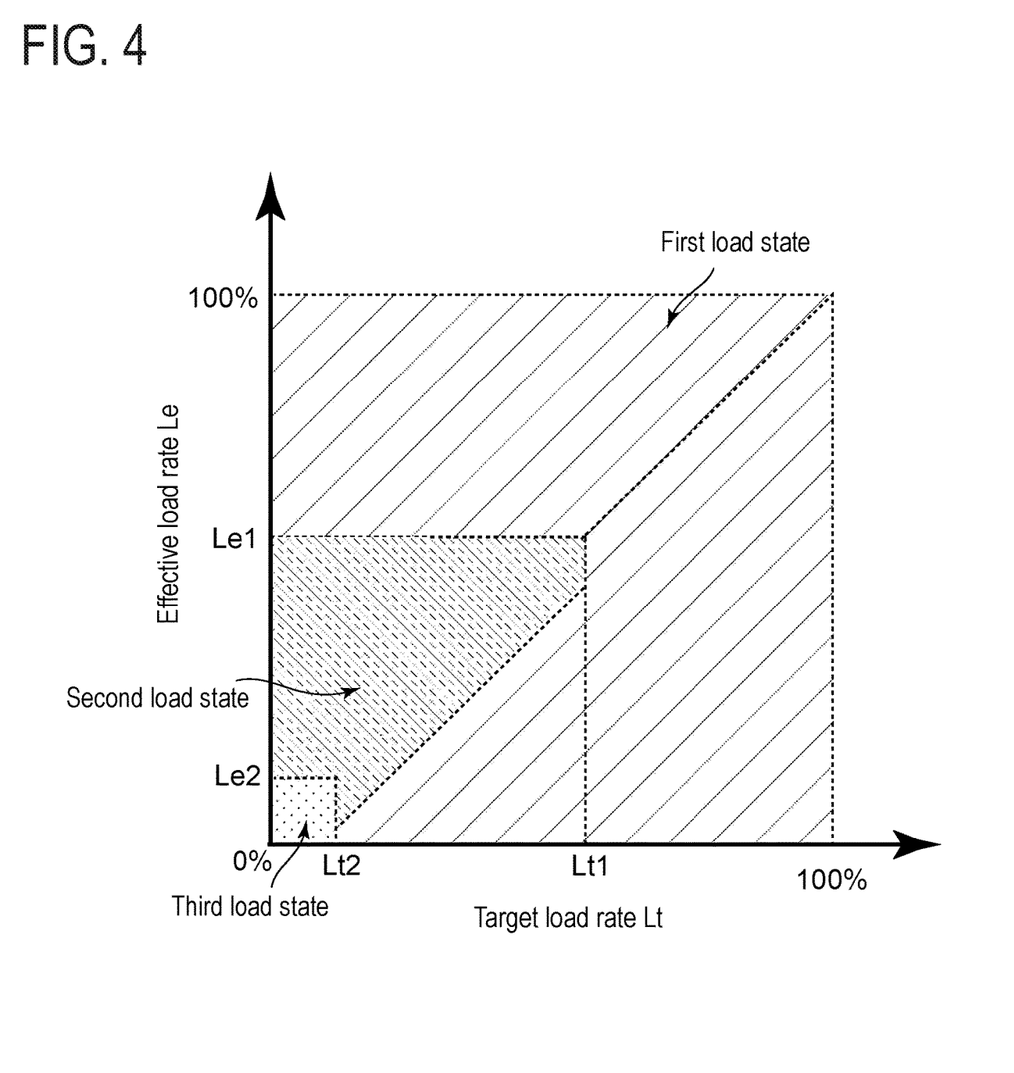
FIG. 4 illustrates a distribution example of a load state with respect to a target load rate and an effective load rate.

Next, description will be provided in detail on a method of determining a load state at the load state determination unit 152 with reference to FIGS. 3 and 4. FIG. 3 is a block diagram illustrating an internal configuration of the load state determination unit 152 in FIG. 1. FIG. 4 illustrates a distribution example of a load state with respect to the target load rate Lt and the effective load rate Le. In this example, the load state of the power generator 108 is determined as belonging to any one of a first load state, a second load state, and a third load state based on the target load rate Lt and the effective load rate Le calculated at the load state determination unit 152.

As illustrated in FIG. 3, the load state determination unit 152 includes a target load rate calculation part 158, an effective load rate calculation part 160, a time counter 162, a difference calculation part 164, and a determination part 166.

The target load rate calculation part 158 obtains the output demand information from the outside and calculates the target load rate Lt based on the output demand information. The effective load rate calculation part 160 obtains a detection value of the output sensor 124 and calculates the effective load rate Le based on the detection value. The time counter 162 measures a time. The difference calculation part 164 calculates a difference $\Delta L$ between the target load rate Lt calculated at the target load rate calculation part 158 and the effective load rate Le calculated at the effective load rate calculation part 160. The determination part 166 determines to which the load state belongs among the first load state, the second load state, and the third load state based on various information input from the target load rate calculation part 158, the effective load rate calculation part 160, the time counter 162, and the difference calculation part 164.

FIG. 4 illustrates an example of distribution of the first load state, the second load state, and the third load state. In this example, the determination part 166 determines to which the load state of the power generator 108 belongs among the first load state, the second load state, and the third load state in accordance with conditions described below.

When two conditions described below are satisfied over a predetermined time period, the determination part 166 determines that the load state of the power generator 108 belongs to the second load state.

The target load rate Lt is equal to or smaller than a threshold value Lt1, and the effective load rate Le is equal to or smaller than a threshold value Le1.

The difference $\Delta L$ between the target load rate Lt and the effective load rate Le is equal to or smaller than a third threshold value $\Delta L1$, or the target load rate Lt is smaller than the effective load rate Le.

Here, the predetermined time period is preferably set, for example, to about one minute.

When a condition described below is satisfied over the predetermined time period, the determination part 166 determines that the load state of the power generator 108 belongs to the third load state.

The target load rate Lt is equal to or smaller than a threshold values Lt2, and the effective load rate Le is equal to or smaller than a threshold value Le2. Here, the threshold value Lt2 is smaller than the threshold value Lt1 and the threshold value Le2 is smaller than the threshold value Le1.

When the load state of the power generator 108 is determined to belong not to the second load state nor the third load state, the determination part 166 determines that the load state of the power generator 108 belongs to the first load state.

In the above, the determination for the first load state is performed by a process of elimination. However, the determination may be performed based on practical conditions. That is, the determination part 166 may determine that the load state of the power generator 108 belongs to the first load state when any one of conditions described below is satisfied within the predetermined time period.

The target load rate Lt is larger than the threshold value Lt1, or the effective load rate Le is larger than the threshold value Le1.

The difference $\Delta L$ between the target load rate Lt and the effective load rate Le is larger than the third threshold value $\Delta LL$ and the target load rate Lt is equal to or larger than the effective load rate Le.

Describing the respective load states in FIG. 4 in a qualitative manner, the second load state corresponds to a state in which a partial load situation continues over the predetermined time period, the third load state corresponds to the vicinity of a no load situation including start-up and shut-down of the turbine 106, and the first load state corresponds to a wide load state including a rated load situation while excluding the second load state and the third load state. In short, the load of the power generator 108 tends to be lowered in the order of the first load state, the second load state, and the third load state.

Returning to FIG. 1, the operation mode selection unit 154 selects an operation mode based on the determination result of the load state determination unit 152. A plurality of operation modes are prepared as being selectable by the operation mode selection unit 154 and any one thereof is selected based on the load state of the power generator 108. In the present embodiment, a first operation mode, a second operation mode, and a third operation mode are prepared to correspond respectively to the first load state, the second load state, and the third load state described above with reference to FIG. 4. That is, when the load state of the power generator 108 is determined by the load state determination unit 152 as belonging to the first load state, the operation mode selection unit 154 selects the first operation mode. When the load state of the power generator 108 is determined by the load state determination unit 152 as belonging to the second load state, the operation mode selection unit 154 selects the second operation mode. When the load state of the power generator 108 is determined by the load state determination unit 152 as belonging to the third load state, the operation mode selection unit 154 selects the third operation mode.

Figure 5:
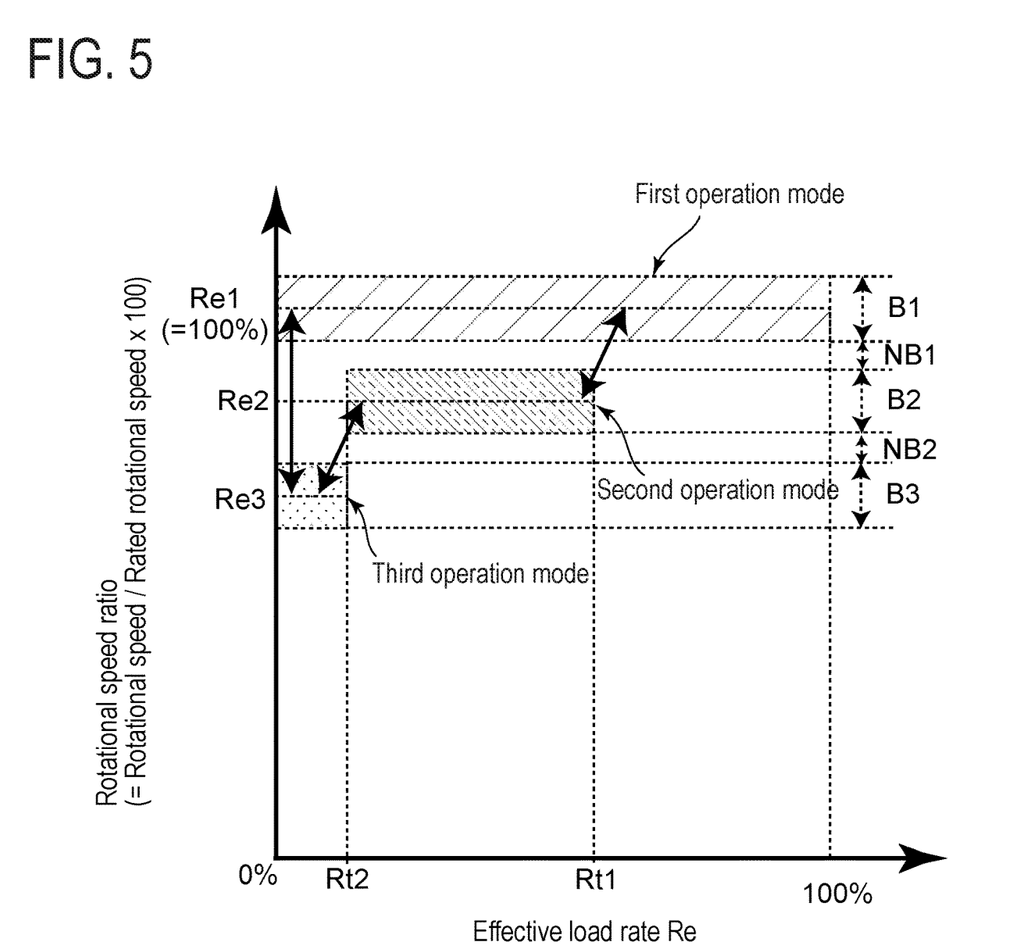
FIG. 5 is a graph illustrating rotational speed characteristics in first to third operation modes.

FIG. 5 is a graph illustrating rotational speed characteristics in the first to third operation modes. Here, a rotational speed ratio at the vertical axis of FIG. 5 represents a ratio of a rotational speed to a rated rotational speed.

The first operation mode is an operation mode to maintain the rotational speed of the turbine 106 within a first rotational speed range B1. The first rotational speed range B1 includes a rated rotational speed Re1 (=100%) and is defined with an allowable range ±ΔRe1 with respect to the rated rotational speed Re1. That is, in the first operation mode, the rotational speed of the turbine 106 may be controlled approximately constant at the rated rotational speed Re1 or may fluctuate within the allowable range ±ΔRe1. The allowable range ±ΔRe1 is, for example, ±3% with respect to the rated rational speed Re1.

The second operation mode is an operation mode to maintain the rotational speed within a second rotational speed range B2. The second rotational speed range B2 is set on a lower speed side than the first rotational speed range B1 and defined with an allowable range ±ΔRe2 with respect to a middle rotational speed Re2. That is, in the second operation mode, the rotational speed of the turbine 106 may be controlled approximately constant at the middle rotational speed Re2 or may fluctuate within the allowable range ±ΔRe2. The allowable range ±ΔRe2 is, for example, ±3% with respect to the middle rational speed Re2.

Further, the second rotational speed range B2 is set on the lower rotational speed side than the first rotational speed range B1 with a first non-selection rotational speed range NB1 set therebetween. That is, the first rotational speed range B1 and the second rotational speed range B2 do not overlap with each other and the first non-selection rotational speed range NB1 exists therebetween. The first non-selection rotational speed range NB1 is set to include an undesirable rotational speed, for example, corresponding to a natural frequency of a turbine blade, shaft vibration caused by an electric circuit included in the power converter 110, and the like. According to the above, malfunction occurrence can be effectively prevented by avoiding operation at the undesirable rotational speed while switching the operation modes in accordance with the load states.

The third operation mode is an operation mode to maintain the rotational speed within a third rotational speed range B3. The third rotational speed range B3 is set on the lower rotational speed side than the second rotational speed range B2 and defined with an allowable range ±ΔRe3 with respect to a middle rotational speed Re3. That is, in the third operation mode, the rotational speed of the turbine 106 may be controlled approximately constant at the middle rotational speed Re3 or may fluctuate within the allowable range ±ΔRe3. The allowable range ±ΔRe3 is, for example, ±3% with respect to the middle rational speed Re3.

Further, the third rotational speed range B3 is set on the lower rotational speed side than the second rotational speed range B2 with a second non-selection rotational speed range NB2 set therebetween. That is, the second rotational speed range B2 and the third rotational speed range B3 do not overlap with each other and the second non-selection rotational speed range NB2 exists therebetween. The second non-selection rotational speed range NB2 is set to include an undesirable rotational speed, for example, corresponding to a natural frequency of a turbine blade, shaft vibration caused by an electric circuit included in the power converter 110, and the like. According to the above, malfunction occurrence can be effectively prevented by avoiding operation at the undesirable rotational speed while switching the operation modes in accordance with the load states.

Figure 6:
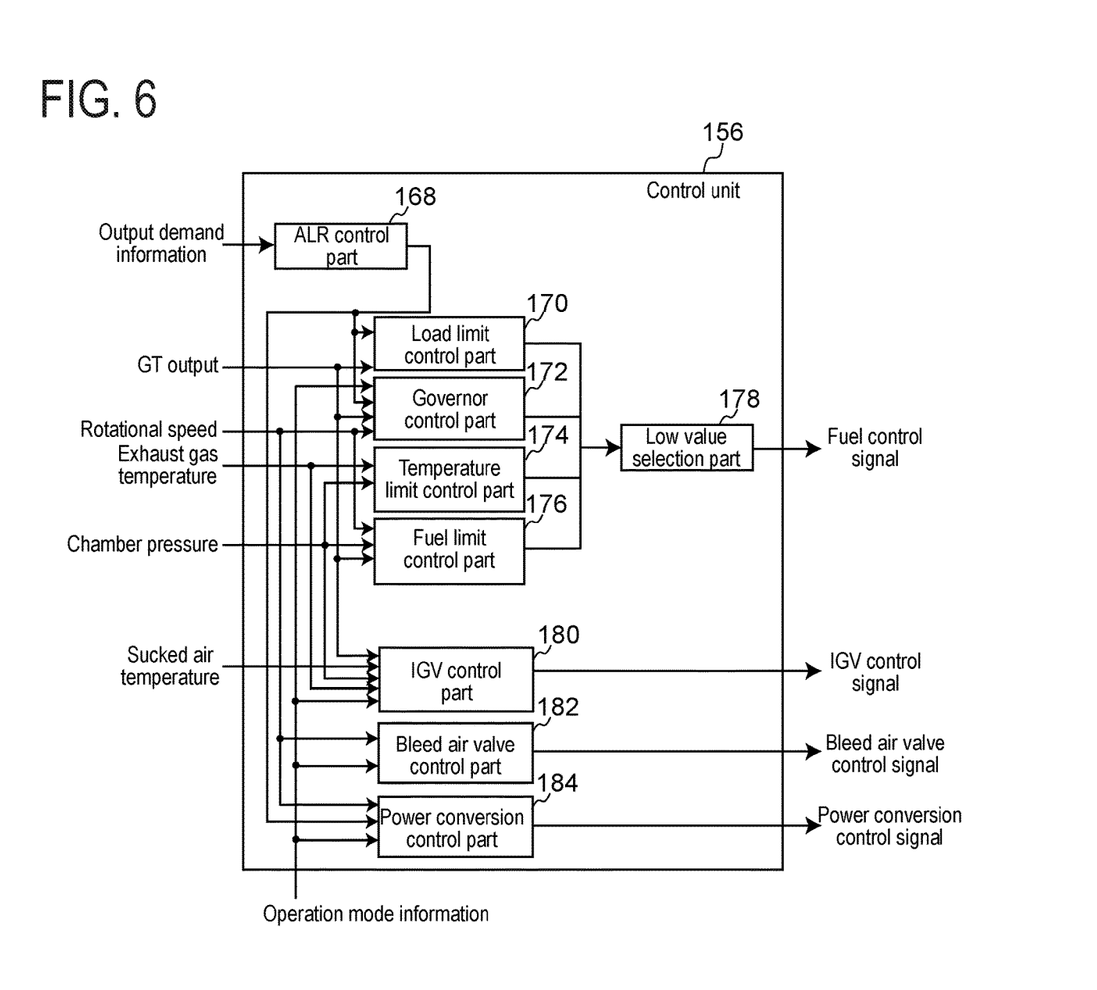
FIG. 6 is a block diagram illustrating an internal configuration of the control unit in FIG. 1.

Returning to FIG. 1, the control unit 156 controls the gas turbine 100 based on the operation mode selected at the operation mode selection unit 154. FIG. 6 is a block diagram illustrating an internal configuration of the control unit 156 in FIG. 1. The control unit 156 includes an ΔLR control part 168, a load limit control part 170, a governor control part 172, a temperature limit control part 174, a fuel limit control part 176, a low value selection part 178, an IGV control part 180, a bleed air valve control part 182, and a power conversion control part 184.

The ΔLR control part 168 calculates the target load rate Lt based on the output demand information supplied from the outside. The load limit control part 170 outputs a fuel flow rate instruction signal for causing the target load rate Lt input from the ΔLR control part 168 to be a limit value previously set based on specifications.

The governor control part 172 outputs a fuel flow rate instruction signal for causing the rotational speed to be a predetermined limit value. In the present embodiment, the governor control part 172 receives operation mode information corresponding to the operation mode selected at the operation mode selection unit 154 and generates the fuel flow rate instruction signal necessary for maintaining the rotational speed within the rotational speed range corresponding to the selected operation mode.

The temperature limit control part 174 outputs a fuel flow rate instruction signal so that temperature at each portion of the gas turbine 100 (e.g., temperature detected by each of the blade pass temperature sensor 116, the exhaust gas temperature sensor 118, and the sucked air state detector 120) becomes a limited value previously set based on the specifications.

The fuel limit control part 176 outputs a fuel flow rate instruction signal so that a fuel flow rate becomes a limited value previously set based on the specifications.

The low value selection part 178 selects and outputs, as a fuel control signal, a signal indicating the lowest fuel flow rate among the fuel flow rate instruction signals out from the load limit control part 170, the governor control part 172, the temperature limit control part 174, and the fuel limit control part 176. The fuel control signal output from the low value selection part 178 is input to the fuel flow rate adjusting valve 112 and fuel flow control corresponding to each operation mode is performed.

The IGV control part 180 calculates and outputs an IGV control signal based on output of the power generator 108 (a detection value of the output sensor 124), sucked air temperature (a detection value of the sucked air state detector 120), chamber pressure of the compressor 102 (a detection value of the in-chamber pressure sensor 122), exhaust gas temperature (a detection value of the exhaust gas temperature sensor 118), and operation mode information (an output signal of the operation mode selection unit 154). The IGV control signal output from the IGV control part 180 is input to the inlet guide vane 114, so that opening adjustment of the inlet guide vane 114 is performed. Owing to that the operation mode information corresponding to the operation mode selected at the operation mode selection unit 154 is input to the IGV control part 180 as described above, the opening adjustment of the inlet guide vane 114 is performed in accordance with each operation mode.

The bleed air valve control part 182 calculates and outputs a bleed air valve control signal based on the rotational speed and the operation mode information (the output signal of the operation mode selection unit 154). Owing to that the operation mode information corresponding to the operation mode selected at the operation mode selection unit 154 is input to the bleed air valve control part 182, control of the bleed air valve 115 is performed in accordance with each operation mode.

The power conversion control part 184 calculates and outputs a power conversion control signal based on a target load rate Lt input from the ΔLR control part 168 (more specifically, a target rotational speed corresponding to the target load rate Lt), a rotational speed, and the operation mode information (the output signal of the operation mode selection unit 154). Owing to that the operation mode information corresponding to the operation mode selected at the operation mode selection unit 154 is input to the power conversion control part 184, control of the power converter 110 is performed in accordance with each operation mode.

As described above, each of the fuel control signal, the IGV control signal, the bleed air valve control signal, and the power conversion control signal is generated in accordance with the type of the operation mode selected at the operation mode selection unit 154. That is, the fuel flow rate, the opening of the inlet guide vane 114, the opening of the bleed air valve 115, and the output of the power converter 110 which are control parameters corresponding respectively to the fuel control signal, the IGV control signal, the bleed air valve control signal, and the power conversion control signal are controlled in accordance with the type of the operation mode.

In the present embodiment, when the first operation mode or the second operation mode is selected at the operation mode selection unit 154, the control unit 156 selects, as control parameters, and adjusts the opening of the inlet guide vane 114 and the fuel flow rate to control turbine output. Further, the control unit 156 selects, as a control parameter, and controls the output of the power converter 110 for converting the output frequency of the power generator 108 into the system frequency to control the rotational speed of the turbine 106. That is, approximately-constant rotational speed control to maintain the rotational speed within the first rotational speed range B1 is performed when the first operation mode is selected, and approximately-constant rotational speed control to maintain the rotational speed within the second rotational speed range B2 is performed when the second operation mode is selected.

Further, when the third operation mode is selected at the operation mode selection unit 154, the control unit 156 selects, as control parameters, and adjusts the opening of the bleed air valve 115 of the compressor 102 in addition to the opening of the inlet guide vane 114 and the fuel flow rate to control the turbine output. Further, the control unit 156 selects, as a control parameter, and controls the output of the power converter 110 for converting the output frequency of the power generator 108 into the system frequency to control the rotational speed of the turbine 106. That is, approximately-constant rotational speed control to maintain the rotational speed within the third rotational speed range B3 is performed when the third operation mode is selected.

Figure 7:
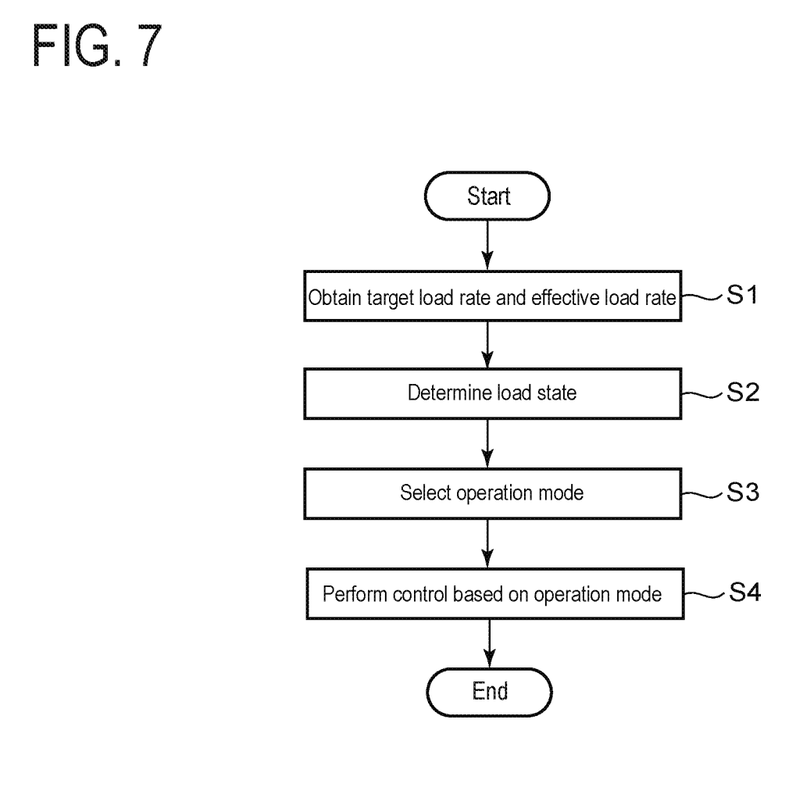
FIG. 7 is a flowchart illustrating each step of an operation control method for a gas turbine according to at least one embodiment of the present invention.

Next, description will be provided on an operation control method to be performed by the control device 150 having the abovementioned configuration. FIG. 7 is a flowchart illustrating each step of the operation control method for the gas turbine 100 according to at least one embodiment of the present invention.

First, the load state determination unit 152 of the control device 150 obtains the target load rate Lt and the effective load rate Le (step S1). As described above, the target load rate Lt is calculated based on the target demand information obtained from the outside and the effective load rate Le is calculated based on the detection value of the output sensor 124.

Subsequently, the load state determination unit 152 determines a load state of the power generator 108 based on the target load rate Lt and the effective load rate Le obtained in step S1 (step S2). The first to third load states to which the load state of the power generator 108 is capable of belonging are previously defined as a map based on the target load rate Lt and the effective load rate Le, as illustrated in FIG. 4. Owing to that the target load rate Lt and the effective load rate Le obtained in step S1 are verified with the map, it is determined that the load state of the power generator 108 belongs to which of the first to third load states.

Subsequently, the operation mode selection unit 154 selects an operation mode corresponding to the load state determined in step S2 (step S3). The operation mode selection unit 154 is capable of selecting the operation mode from among the first to third operation modes previously defined corresponding respectively to the first to third load states, as illustrated in FIG. 5.

Subsequently, the control unit 156 controls the gas turbine 100 in accordance with the operation mode selected in step S3 (step S4). Accordingly, the rotational speed of the gas turbine 100 is maintained within the rotational speed range of each operation mode illustrated in FIG. 5. In each operation mode, approximately-constant rotational speed control is performed as maintaining the rotational speed of the gas turbine 100 within the corresponding rotational speed range. Here, since the rotational speed ranges corresponding to the first operation mode, the second operation mode, and the third operation mode are toward the lower rotational speed side in the order thereof, fuel consumption can be reduced by switching the operation modes in accordance with the load state of the power generator 108.

Further, the first non-selection rotational speed range NB1 exists between the first rotational speed range B1 corresponding to the first operation mode and the second rotational speed range B2 corresponding to the second operation mode and the second non-selection rotational speed range NB2 exists between the second rotational speed range B2 corresponding to the second operation mode and the third rotational speed range B3 corresponding to the third operation mode. Accordingly, owing to that an undesirable rotational speed, for example, corresponding to a natural frequency of a turbine blade or shaft vibration caused by an electric circuit is set to be included in the first non-selection rotational speed range NB1 or the second non-selection rotational speed range NB2, malfunction occurrence can be effectively prevented by avoiding operation at the undesirable rotational speed while switching the operation modes in accordance with the load states.

As described above, according to the embodiment described above, it is possible to provide an operation control device and an operation control method for a single shaft gas turbine capable of effectively preventing malfunction occurrence such as a shaft vibration phenomenon while improving fuel consumption by reducing a rotational speed in accordance with load and a program therefor.

INDUSTRIAL APPLICABILITY

At least one embodiment of the present invention is capable of being used for an operation control device and an operation control method for a single shaft gas turbine and a program therefor.

The invention claimed is:

1. An operation control device for a single shaft gas turbine configured to supply compressed air from a compressor and a fuel into a combustor and drive a power generator by rotating a turbine, power output from the power generator is supplied to a power system through a power converter, connected to a rotational shaft common to the compressor and the power generator, with combustion gas generated by the combustor, the operation control device comprising:
a load state determination unit determining a load state of the power generator;
an operation mode selection unit configured to be capable of selecting, based on a determination result of the load state determination unit, from among a first operation mode to maintain a rotational speed of the turbine within a first rotational speed range and a second operation mode to maintain the rotational speed within a second rotational speed range set on a lower rotational speed side than the first rotational speed range with a first non-selection rotational speed range set therebetween; and
a control unit controlling the turbine based on an operation mode selected at the operation mode selection unit, and
wherein the first non-selection rotational speed range includes a rotational speed corresponding to shaft vibration caused by an electric circuit included in the power converter.

2. The operation control device for the single shaft gas turbine according to claim 1,
wherein the load state determination unit determines the load state based on a target load rate set for the power generator and an effective load rate of the power generator.

3. The operation control device for the single shaft gas turbine according to claim 2,
wherein the load state determination unit determines that the load state belongs to a first load state when any one of (i) to (iii) is satisfied within a predetermined time period, and
the operation mode selection unit selects the first operation mode when the load state is determined as belonging to the first load state;
(i) the target load rate is larger than a first threshold value,
(ii) the effective load rate is larger than a second threshold value, and
(iii) a difference between the target load rate and the effective load rate is larger than a third threshold value, and the target load rate is equal to or larger than the effective load rate.

4. The operation control device for the single shaft gas turbine according to claim 2,
wherein the load state determination unit determines that the load state belongs to a second load state when (iv) to (vi) are satisfied over a predetermined time period, and
the operation mode selection unit selects the second operation mode when the load state is determined as belonging to the second load state;
(iv) the target load rate is equal to or smaller than a first threshold value,
(v) the effective load rate is equal to or smaller than a second threshold value, and
(vi) the difference between the target load rate and the effective load rate is equal to or smaller than a third threshold value, or the target load rate is smaller than the effective load rate.

5. The operation control device for the single shaft gas turbine according to claim 1,
wherein, in the first operation mode and the second operation mode, the control unit controls output of the turbine by adjusting an opening of an inlet guide vane arranged at an upstream stage of the compressor and a flow rate of the fuel, and controls the rotational speed of the turbine by controlling output of the power converter converting an output frequency of the power generator into a system frequency.

6. The operation control device for the single shaft gas turbine according to claim 1,
wherein the first non-selection rotational speed range includes a rotational speed corresponding to a natural frequency of a turbine blade included in the turbine.

7. The operation control device for the single shaft gas turbine according to claim 1,
wherein the operation mode selection unit is configured to be capable of selecting a third operation mode to maintain the rotational speed within a third rotational speed range set on a lower rotational speed side than the second rotational speed range with a second non-selection rotational speed range set therebetween.

8. The operation control device for the single shaft gas turbine according to claim 7,
wherein the load state determination unit determines that the load state belongs to a third load state when (vii) and (viii) are satisfied over a predetermined time period, and
the operation mode selection unit selects the third operation mode when the load state is determined as belonging to the third load state;
(vii) the target load rate is equal to or smaller than a fourth threshold value, and
(viii) the effective load rate is equal to or smaller than a fifth threshold value.

9. The operation control device for the single shaft gas turbine according to claim 7,
wherein, in the third operation mode, the control unit controls output of the turbine by adjusting an opening of an inlet guide vane arranged at an upstream stage of the compressor, a flow rate of the fuel, and an opening of a bleed air valve of the compressor, and controls the rotational speed of the turbine by controlling output of the power converter converting an output frequency of the power generator into a system frequency.

10. The operation control device for the single shaft gas turbine according to claim 7,
wherein the second non-selection rotational speed range includes a natural frequency of a turbine blade included in the turbine.

11. The operation control device for the single shaft gas turbine according to claim 7,
wherein the second non-selection rotational speed range includes a second rotational speed corresponding to shaft vibration caused by the electric circuit included in the power converter.

12. A non-transitory computer readable medium storing a program for operationally controlling a single shaft gas turbine configured to supply compressed air from a compressor and fuel into a combustor and drive a power generator by rotating a turbine, power output from the power generator is supplied to a power system through a power converter, connected to a rotational shaft common to the compressor and the power generator, with combustion gas generated by the combustor, the program causing a computer to execute steps of:
determining a load state of the power generator;
selecting, based on a determination result of the load state, from among a first operation mode to maintain a rotational speed of the turbine within a first rotational speed range and a second operation mode to maintain the rotational speed within a second rotational speed range set on a lower rotational speed side than the first rotational speed range with a first non-selection rotational speed range set therebetween; and controlling the turbine based on a selected operation mode, and wherein the first non-selection rotational speed range includes a rotational speed corresponding to shaft vibration caused by an electric circuit included in the power converter.

\* \* \* \* \*